June 12, 1934.  C. S. TRACY  1,962,263
LAWN SPRINKLER
Filed Aug. 22, 1933
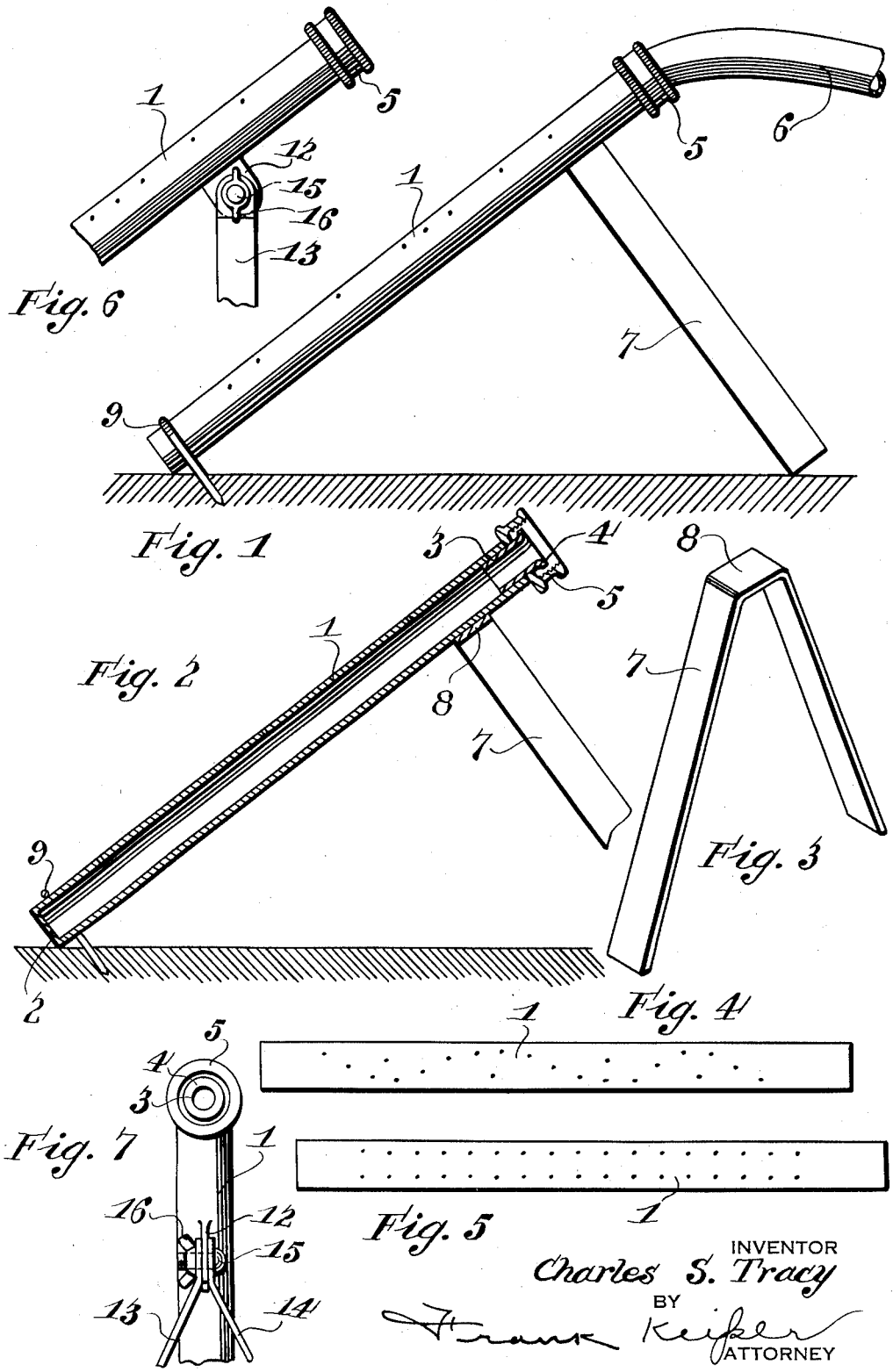
INVENTOR
Charles S. Tracy
BY
Frank Keifer
ATTORNEY Patented June 12, 1934

1,962,263

UNITED STATES PATENT OFFICE 1,962,263

LAWN SPRINKLER

Charles S. Tracy, Rochester, N. Y.

Application August 22, 1933, Serial No. 686,253

2 Claims. (Cl. 299—19)

The object of this invention is to provide a new and improved type of lawn sprinkler.

Another object of the invention is to provide a lawn sprinkler that can be picked up and carried about while the water is flowing therefrom without wetting the operator and without turning off the water.

Another object of the invention is to provide a lawn sprinkler that is tilted up at the coupling end and is supported on an incline by two legs with which it forms a tripod.

This and other objects of the invention will be fully illustrated in the drawing described in the specification and pointed out in the claims at the end thereof.

In the drawing:

Figure 1 is a side elevation of my improved lawn sprinkler.

Figure 2 is a vertical longitudinal section of my improved lawn sprinkler.

Figure 3 is a perspective view of the V shaped legs by which the coupling end of the sprinkler shown in Figures 1 and 2 is supported.

Figure 4 is a top plain view of the tube showing the arrangement of the holes therein.

Figure 5 is a top plain view of the tube showing the modified form of the arrangement of the holes therein.

Figure 6 is a side elevation of the sprinkler partly broken away showing a modified form of support therefor.

Figure 7 is an elevation of the sprinkler viewed from the right of Figure 6, the sprinkler being shown broken partly away.

My improved lawn sprinkler consists of a tube 1, preferably of brass, closed at one end 2, and having a sleeve 3, fastened therein, which sleeve is flanged at the outer end as indicated at 4. This sleeve is loosely surrounded by the female threaded part 5, of an ordinary hose coupling. This part 5, screws on to the male part of the hose coupling, which is normally on the end of the hose 6. In this way the sprinkler is attached to the end of the hose. The sprinkler tube is attached to a V shaped support 7, having two legs, which support is adapted to hold the tube at an angle of about forty degrees when the blind end of the tube and the legs rest in the ground in the form of a tripod. It will be understood that the tube is ordinarily about 12 inches long and the yoke 8, of the legs, is connected to the tube far enough away from the blind end and near enough to the coupling so that the gravity of the blind end of the tube will normally cause it to rest on the ground when the hose is attached to the coupling. If the hose is stiff or heavy, the blind end of the tube may be held down by a staple 9, which is first pushed into the ground and then the blind end of the tube is inserted in the opening in the staple. In this manner the blind end of the sprinkler tube is positively held down in contact with the ground.

The tube of the sprinkler is perforated with holes thru which the water is sprayed and these holes may be arranged in any suitable pattern, the more desirable pattern being shown in Figure 4, in which the holes are shown arranged in a serpentine line with some extra holes out of line with the serpentine line.

In Figure 5 I have shown the tube with straight lines of holes therein. These arrangements may be varied in many ways but it will be understood that the arrangement as shown in Figure 4 is preferred.

In Figure 6 I have shown a lug 12, fastened on the bottom of the tube 1, together with separate legs 13 and 14. These legs are suitably bent at the top to rest flat against the lug 12, and are spread apart at the bottom. The lug and the legs are suitably clamped together by the bolt 15 and the thumb nut 16, so that the tube and the two legs form a tripod in which the tube is supported at a suitable angle to the ground. By releasing the thumb nut 16, the legs 13 and 14 may be rocked on the bolt 15 as a center and put in place again so as to vary the angle at which the tube 1, is supported. In most cases it is desirable to have the outer ends of the legs approximately under or beyond the coupling end of the sprinkler, and the tube should be heavy enough at the blind end to hold itself down by its weight.

It has been found in practice that the operator can turn on the water and while the water is flowing from the sprinkler he can pick up the sprinkler by the coupling or by the hose adjacent thereto and carry it from one place to another and set it down on the ground without getting wet, thus obviating the need of shutting off the water. And by varying the angle at which the tube is pitched, the width of the lawn that is being sprinkled can be varied as desired, and in ordinary practice with 30 pounds or forty pounds pressure, this sprinkler will cover an area about 40 feet wide transverse to the tube and about 14 feet long or more along the axis of the tube depending upon the angle at which the tube is held, which angle may be varied by shifting the position of the adjustable legs as shown in Figures 6 and 7, or by putting a board or a block under the stationary legs as they are shown in Figures 1 and 2. It will also be understood that the water thrown from this sprinkler will cover an area that is approximately a rectangle with rounded corners of the dimensions above stated, which area will be varied depending upon whether the air is still or is blowing. It will also be understood that the blind end can be blocked up to vary the angle but ordinarily it is preferable to let the blind end rest upon the ground.

I claim:

1. A sprinkler comprising a hollow tube closed at one end, a coupling at the open end, said tube having holes therein for spraying water therefrom, legs under said tube near the coupling end and adapted to hold up the coupling end while the closed end rests on the ground with the tube in an inclined position, said legs and tube forming a tripod.

2. A sprinkler comprising a hollow tube closed at one end, a coupling at the open end, said tube having holes therein for spraying water therefrom, a support under said tube near the coupling end adapted to hold up the coupling end while the closed end rests on the ground with the tube in an inclined position.

CHARLES S. TRACY.